United States Patent [19]

Sugiura et al.

[11] Patent Number: 6,033,806
[45] Date of Patent: Mar. 7, 2000

[54] METHOD OF PRODUCING A CROSS-LINKED POLYVINYL ALCOHOL SEPARATOR FOR AN ALKALI-ZINC SECONDARY BATTERY

[75] Inventors: Izuru Sugiura, Yokohama; Seiichi Akita, Fujisawa; Nobuyuki Kuroda, Yokohama, all of Japan

[73] Assignee: Nippon Oil Co., Ltd., Tokyo, Japan

[21] Appl. No.: 09/034,487

[22] Filed: Mar. 3, 1998

[30] Foreign Application Priority Data

Mar. 5, 1997 [JP] Japan ................................. 9-050530
Jul. 31, 1997 [JP] Japan ................................. 9-206016

[51] Int. Cl.⁷ ........................................................ H01M 2/14
[52] U.S. Cl. ............................................ 429/229; 525/61
[58] Field of Search ................................. 429/229; 525/61

[56] References Cited

U.S. PATENT DOCUMENTS 3,951,687  4/1976  Takamura et al. .......................... 429/94
4,277,572  7/1981  Fujiwara et al. ........................... 525/61
5,789,081  8/1998  Komatsu et al. ........................... 428/398

Primary Examiner—Maria Nuzzolillo
Assistant Examiner—Monique Wills
Attorney, Agent, or Firm—Darby & Darby

[57] ABSTRACT

A method for producing a cross-linked polyvinyl alcohol separator having a film of cross-linked polyvinyl alcohol for an alkali-zinc secondary battery, and a cross-linked polyvinyl alcohol separator produced by the method are disclosed. The method includes the steps of:

(1) providing a film of polyvinyl alcohol having degree of saponification of 70 to 98.5% and containing 1,2-diol units;

(2) contacting the film of polyvinyl alcohol with an oxidizing agent to effect oxidative cleavage of the 1,2-diol units;

(3) contacting the film of polyvinyl alcohol with an acid catalyst to catalyze acetalization to form a film of cross-linked polyvinyl alcohol; and (4) preparing a separator with the film of cross-linked polyvinyl alcohol.

19 Claims, 2 Drawing Sheets

METHOD OF PRODUCING A CROSS-LINKED POLYVINYL ALCOHOL SEPARATOR FOR AN ALKALI-ZINC SECONDARY BATTERY

FIELD OF THE INVENTION

The present invention relates to a method for producing a separator for alkali-zinc secondary batteries such as nickel-zinc batteries, air-zinc batteries, silver oxide-zinc batteries, or manganese oxide-zinc batteries, and a separator for alkali-zinc secondary batteries produced by such method.

BACKGROUND ART

In recent years, electric motor vehicles such as electric vehicles, electric bicycles, electric fork lifts, and electric wheelchairs; portable devices such as power tools and portable lighting devices; and portable electronic devices such as personal computers and portable telephones are demanded to have longer lives, higher outputs, smaller sizes, lighter weights, and lower prices. In order to meet such demands, secondary batteries for such devices are required to have still smaller size, higher performance, and lower prices.

At present, lead storage batteries and nickel-cadmium batteries are predominantly used as secondary batteries. In addition, nickel-hydrogen batteries and lithium ion batteries are being put into practical use. However, these batteries still have considerable problems to be solved in order to meet the above demands, and thus do not yet have satisfactory properties.

Specifically, for example, lead storage batteries are highly reliable and can be produced at low cost, but are insufficient in output density per weight and energy density. Nickel-cadmium batteries have been drawing attention for the problems in the treatment after use since they contain cadmium. In the environmental point of view, the use of nickel-cadmium batteries are anticipated to be limited. The newly developed nickel-hydrogen batteries have performance comparable to nickel-cadmium batteries, but have problems in its high cost associated with the hydrogen absorbing alloy. Lithium ion batteries are still costly due to its cathode material, electrolyte, and separator having shut-down function, and thus anticipated to have difficulty in wide use.

In view of the above, secondary batteries which can be produced at low cost, which are free from the risk of environmental pollution upon disposal, and which have high output density and high energy density have been demanded, and nickel-zinc batteries, air-zinc batteries, silver oxide-zinc batteries, and manganese oxide-zinc batteries have been developed for meeting these demands. However, these batteries have serious drawbacks in that arborescent zinc dendrite grow from the zinc electrode during charging, and finally reach the nickel electrode to cause short-circuiting inside the battery. Thus, such alkali-zinc batteries have not yet been put into practical use in a universal and industrial scale.

In order to prevent the short-circuit due to the zinc dendrite, there have been proposed to add an inhibitory agent to the zinc electrode or the electrolyte for suppressing the crystal growth, or to modify the battery structure with controlled amount of electrolyte. Nickel-zinc secondary batteries wherein such modification is combined with use of a cellophane separator have been developed and some of them have been used in practice. In these batteries, however, the growth of dendrite is not suppressed completely, and thus the risk of short-circuit due to penetration of the cellophane separator by dendrite has not been avoided, so that the cycle life of the batteries are still unreliable.

A different approach for preventing short-circuit inside the battery due to dendrite has been proposed, wherein the growth of dendrite is prevented by the separator (U.S. Pat. Nos. 4,154,912 and 4,272,470). This approach features cross-linking of polyvinyl alcohol (referred to as PVA hereinbelow) molecules in a PVA film by acetalization to form networks between the molecules, thereby delaying the arrival of zinc dendrite to the nickel electrode.

Films obtained by the above conventional methods have problems in that those having good properties to suppress growth of dendrite have high electrical resistance (film resistance) and thus are not suitable as battery materials, whereas those having reduced film resistance are easily penetrated by dendrite and thus do not offer improvement in battery life.

Further, when the cross-linking reaction of PVA including two successive reactions, i.e. oxidative cleavage of 1,2-diol units in PVA to form aldehydes and acetalization of two hydroxyl groups in PVA with aldehyde using the catalysis of proton, are effected in two separate steps, the film strength is lowered during the former oxidative cleavage step to cause difficulties in subsequent handling and treatment of the film. In addition, the property to suppress growth of dendrite may not be improved sufficiently in proportion to increase in the film resistance with the progress of cross-linking.

In assembling batteries in an industrial scale, the electrode parts including the retainers (a material capable of wicking electrolyte) interposed between the electrodes and the separator are usually assembled first, and then an appropriate amount of electrolyte is charged, whereby the separator is preferably swelled to saturation.

However, if the time required for the separator to swell to saturation in the electrolyte is too long, the production efficiency of the batteries is lowered. Further, when the swelling rate of the separator is remarkably slower than the swelling rate of the retainers, other parts of the battery such as the retainers will swell first in the limited space between the electrodes, so that there will be little room for the separator to swell sufficiently. As a result, the film resistance is increased and the battery properties are deteriorated. In addition, when the separator is expanded more in the two-dimensional direction in the electrolyte, the separator is likely to be puckered with the progress of swelling, thereby lowering the battery properties. The slower the swelling rate of the separator in the electrolyte, the more remarkable this tendency will be. In the light of these, it is preferred, in view of battery assembling, that the swelling rate of the separator in an alkali electrolyte is as fast as possible, and that the swelling of the separator in the two-dimensional direction is as small as possible.

DISCLOSURE OF THE INVENTION

Therefore, it is an object of the present invention to provide a method for producing easily a separator for a secondary battery and a separator produced by such method, which may be used for a variety of alkali-zinc secondary batteries such as nickel-zinc batteries, air-zinc batteries, silver oxide-zinc batteries, or manganese oxide-zinc batteries.

It is another object of the present invention to provide a method for producing easily a separator for a secondary battery and a separator produced by such method, which is highly durable in an alkaline electrolyte.

It is another object of the present invention to provide a method for producing easily a separator for a secondary battery and a separator produced by such method, which provides prolonged suppression of growth of zinc dendrite on the zinc electrode so as to prevent penetration of the separator by dendrite, and which, thus, prevents short-circuiting inside the battery for a prolonged period of time.

It is a further object of the present invention to provide a method for producing easily a separator for a secondary battery and a separator produced by such method, which has low film resistance and improved swelling behavior.

According to the present invention, there is provided a method for producing a cross-linked polyvinyl alcohol separator comprising a film of cross-linked polyvinyl alcohol for an alkali-zinc secondary battery comprising the steps of:

(1) providing a film of polyvinyl alcohol having degree of saponification of 70 to 98.5% and containing 1,2-diol units;

(2) contacting said film of polyvinyl alcohol with an oxidizing agent to effect oxidative cleavage of said 1,2-diol units;

(3) contacting said film of polyvinyl alcohol with an acid catalyst to catalyze acetalization to form a film of cross-liked polyvinyl alcohol; and (4) preparing a separator with said film of cross-linked polyvinyl alcohol.

According to the present invention, there is also provided a method for producing a cross-linked polyvinyl alcohol separator for an alkali-zinc secondary battery as mentioned above wherein said steps of (2) contacting said film of polyvinyl alcohol with an oxidizing agent and (3) contacting said film of polyvinyl alcohol with an acid catalyst are carried out simultaneously by reacting said film of polyvinyl alcohol with said oxidizing agent in the presence of said acid catalyst to form a film of cross-linked polyvinyl alcohol.

According to the present invention, there is also provided a cross-linked polyvinyl alcohol separator for an alkali-zinc secondary battery comprising a film of cross-linked polyvinyl alcohol obtained by a method comprising the steps of:

(1) providing a film of polyvinyl alcohol having degree of saponification of 70 to 98.5% and containing 1,2-diol units;

(2) contacting said film of polyvinyl alcohol with an oxidizing agent to effect oxidative cleavage of said 1,2-diol units; and (3) contacting said film of polyvinyl alcohol with an acid catalyst to catalyze acetalization to form a film of cross-linked polyvinyl alcohol.

According to the present invention, there is further provided a separator as mentioned above wherein said film of cross-linked polyvinyl alcohol is impregnated with glycerin.

PREFERRED EMBODIMENTS OF THE INVENTION

Figure 1:
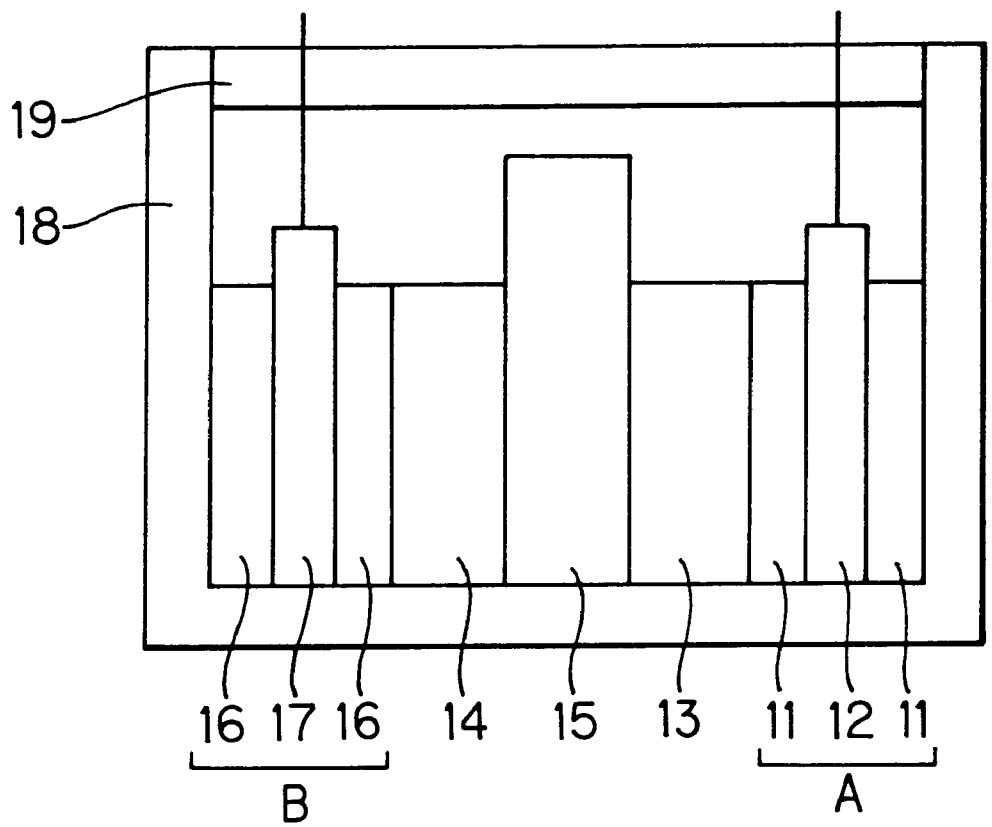
FIG. 1 is a schematic view of a simplified nickel-zinc secondary battery used in Examples and Comparative Examples for evaluating charge-discharge cycle life.

The present invention will now be explained in more detail.

The method for preparing a cross-linked polyvinyl alcohol separator for an alkali-zinc secondary battery of the present invention includes the steps of (1) providing a film of polyvinyl alcohol having the particular degree of saponification, (2) contacting the film of polyvinyl alcohol with an oxidizing agent, and (3) contacting the film of polyvinyl alcohol with an acid catalyst to form a film of cross-linked polyvinyl alcohol, and (4) preparing a separator with the film of cross-linked polyvinyl alcohol.

The film of PVA having the particular degree of saponification provided in the first step is a film formed of PVA of which degree of saponification is 70 to 98.5%, preferably 88 to 96%, and which contains 1,2-diol units. If the degree of saponificatior is not less than 98.5%, molecules of PVA have been bonded together by means of hydrogen bond between the hydrogen groups in PVA, and crystallized. As a result, the ionic permeability of PVA has been inhibited to increase the electrical resistance of the resulting cross-linked film. If the degree of saponification is less than 70%, the property to suppress growth of dendrite is not improved sufficiently by cross-linking. In addition, a film of PVA having the degree of saponification of less than 70% is not prepared easily since the handling of such PVA is not sufficiently good.

The PVA having the particular degree of saponification contains 1,2-diol units. The content of 1,2-diol units in the PVA is not particularly limited. Here, the content of 1, 2-diol units in the PVA is defined as a ratio of half the number of carbon atoms relating to 1,2-diol units to the number of carbon atoms in the main chain of PVA to which a hydroxyl group is bonded. Preferably, the maximum content of 1,2-diol units in the PVA is usually 20%, more preferably 10%, whereas the minimum content is usually 0.1%, more preferably 0.5%. The rest of the PVA is mainly composed of 1,3-diol units, but may contain alkyl structures having 2 or more carbon atoms.

The average degree of polymerization of the PVA is usually not lower than 50, preferably not lower than 100, more preferably not lower than 200, in view of film forming property. The maximum average degree of polymerization of the PVA is not particularly limited, but is usually not higher than 10000, preferably not higher than 7000.

The average thickness of the film of the PVA is not particularly limited, but preferably not more than 100 $\mu$m, more preferably not more than 50 $\mu$m, most preferably not more than 40 $\mu$m. By using the film of PVA having the average thickness of not more than 100 $\mu$m, the thickness of the resulting separator will be not more than 100 $\mu$m. Consequently, the resulting separator is given low film resistance and good ionic- and water-permeabilities between the electrode plates. The minimum average thickness of the film of the PVA is not particularly limited, but is preferably not less than 10 $\mu$m in view of industrial film forming process and the handling facility in the subsequent treatment. It is preferred that the film of the PVA is uniform.

It is preferred to select the film thickness and the degree of saponification within the above range to be properly balanced. Specifically, PVA having low degree of saponification results in low film resistance, so that the film may be relatively thick in order to improve the property to suppress growth of dendrite. On the other hand, PVA having high degree of saponification results in improved property to suppress growth of dendrite, so that the film may be relatively thin in order to reduce the film resistance. In sum, reduced film thickness is selected for PVA having higher degree of saponification, and increased film thickness is selected for PVA having lower degree of saponification to adjust the balance between the film thickness and the degree of saponification. As a result of such adjustment, a separator may be produced having both low film resistance and improved property to suppress growth of dendrite, which properties are usually believed to be incompatible.

The film of the PVA may contain, in addition to the PVA having the particular degree of saponification, additives such as a softening agent, a surfactant, and stabilizer used in film forming process. The film may also contain polysaccharides which improve hydrophilic property of the film. Further, the film may be formed of a single kind of PVA or of a plurality of kinds of PVA having different degrees of saponification.

The method for preparing the film of the PVA is not particularly limited, and the film may be prepared by the following process.

For example, vinyl acetate monomers are polymerized by radical polymerization in accordance with a conventional method to produce polyvinyl acetate. In this step, a radical polymerization initiator such as benzoyl peroxide or azobisisobutyronitrile (AIBN) may be used. Then, polyvinyl acetate is saponified in the presence of sodium hydroxide or the like in a solvent such as methanol, thereby producing PVA. By controlling the reaction time, PVA having the particular degree of saponification may be obtained. The degree of saponification may be confirmed, for example, by NMR. Next, the PVA having the particular degree of saponification thus obtained is dissolved in water, poured onto a smooth plate or a drum, and dried, thereby producing a film of the PVA. The film thickness may be controlled by adjusting the concentration of the aqueous solution of the PVA.

With the method of the present invention, steps of (2) contacting the film of the PVA having the particular degree of saponification with an oxidizing agent and (3) contacting the film with an acid catalyst are carried out, to thereby producing a film of cross-linked PVA.

In the step of (2) contacting the film of the PVA with an oxidizing agent, oxidative cleavage of 1,2-diol units in the PVA is effected. In the step of (3) contacting the film of the PVA with an acid catalyst, the PVA is cross-linked by acetalization thereby forming a film of cross-linked PVA. More specifically, oxidative cleavage of 1,2-diol units in the PVA is effected to generate aldehydes, which are then reacted with hydroxyl groups in 1,3-diol units in the PVA to effect acetalization, thereby cross-linking the PVA.

The oxidizing agent used for effecting oxidative cleavage is not particularly limited. For example, periodic acid ($HIO_4$), sodium metaperiodate ($NaIO_4$), potassium metaperiodate ($KIO_4$), lead tetraacetate ($Pb(OAc)_4$, wherein Ac stands for an acetyl group), activated manganese dioxide, salts of trivalent thallium, or mixtures thereof may be used (J. March, *ADVANCED ORGANIC CHEMISTRY*, Fourth Edition, pp. 1174). Among these, sodium metaperiodate is particularly preferred.

The amount of the oxidizing agent is not particularly limited. But it is effective to use excess amount of oxidizing agent, i.e. more than 100 mole of the oxidizing agent per 1 mole of 1,2-diol units in the film of the PVA.

The acid catalyst for catalyzing acetalization is preferably an acid catalyst which generates H+, for example, inorganic acid such as sulfuric acid, nitric acid, or hydrogen chloride; or organic acid such as acetic acid, oxalic acid, or benzoic acid; or mixtures thereof.

The amount of the acid catalyst is not particularly limited. But it is preferred that the amount of the acid catalyst is not less than twice, more preferably not less than five times the amount of the oxidizing agent by mole. The maximum amount of the acid catalyst is usually about twenty times, preferably ten times the amount of the oxidizing agent by mole.

It is believed that cross-linking by way of the oxidative cleavage and the acetalization using the oxidizing agent and the acid catalyst proceeds generally in accordance with the following formulae, wherein R is divalent and stands for a unit constituting the PVA chain having the particular degree of saponification.

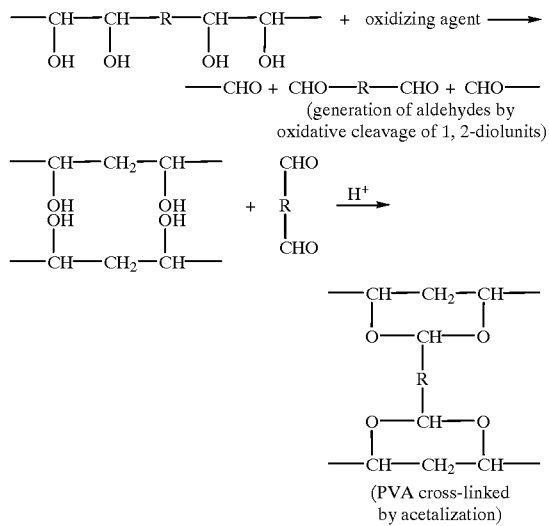

(PVA cross-linked by acetalization)

The step of (2) contacting the film of the PVA with the oxidizing agent and (3) contacting the film of the PVA with the acid catalyst may be carried out in two separate contacting steps in this order, or may be carried out in one contacting step in a single reaction system. In the latter case, the film of the PVA may be contacted with the oxidizing agent in the presence of the acid catalyst. It is preferred to contact the film of the PVA with both of the oxidizing agent and the acid catalyst simultaneously in one contacting step in a single reaction system, rather than contacting the film of the PVA with the oxidizing agent and the acid catalyst in two separate contacting steps, in order to produce a separator satisfying both the low film resistance and the improved property to suppress growth of dendrite.

The operation for contacting the film of the PVA with the oxidizing agent and the acid catalyst simultaneously in one contacting step in a single reaction system is not particularly limited, and the following methods may be employed:

(A) immersing the film of the PVA in an aqueous solution of the oxidizing agent and the acid catalyst;

(B) spraying an aqueous solution of the oxidizing agent and the acid catalyst over the film of the PVA;

(C) applying an aqueous solution of the oxidizing agent and the acid catalyst to the film of the PVA;

(D) adding in advance the oxidizing agent and the acid catalyst to the film of the PVA, and placing the film with the additives under the conditions to effect the oxidizing cleavage and acetalization; or (E) forming a film from a mixture of PVA with the particular degree of saponification which has an aldehyde group at one or both terminals and has been mixed with an organic cross-linking agent, and PVA with the particular degree of saponification which is free of the former PVA having an aldehyde group, and subsequently contacting the resulting film with a mixture of the oxidizing agent and the acid catalyst or only the acid catalyst.

Among these, the method (A) is particularly preferred.

When the film of the PVA is contacted with the oxidizing agent and the acid catalyst in accordance with the above method (1) by immersing the film of the PVA in the aqueous solution, it is preferred to add to the aqueous solution of the oxidizing agent and the acid catalyst a dissolution inhibitor such as salts including, for example, sodium sulfate, potassium sulfate, ammonium sulfate, potassium aluminum sulfate $(KAl(SO_4)_2)$, potassium citrate, zinc sulfate, copper sulfate, iron sulfate, aluminum sulfate, sodium phosphate, potassiumbichromate, or salts of boric acid; or water-soluble organic substances including, for example, methanol, acetone, ethylene glycol, or dimethylsulfoxide; or mixtures thereof, in order to prevent dissolution of non-cross-linked or lowly-cross-linked PVA in the reaction liquid.

The amount of the dissolution inhibitor is not particularly limited, and may suitably be selected as long as the object of the present invention is achieved. For example, the amount of a typical dissolution inhibiting agent, anhydrous sodium sulfate, may be in the range from the minimum amount of $Na_2SO_4 : H_2O=1:5$ (by weight) up to the maximum amount for saturating the reaction liquid.

When the film of the PVA is contacted with the oxidizing agent and the acid catalyst in one contacting step in a single reaction system, the reaction temperature is usually 25 to 90° C., preferably 40 to 80° C., and the reaction time is usually 10 minutes to 10 hours, preferably 30 minutes to 4 hours.

The contacting of the film of the PVA with the oxidizing agent and subsequently with the acid catalyst in two separate contacting steps in this order may be carried out, for example, by:

immersing the film of the PVA in an aqueous solution of the oxidizing agent, and then adding the acid catalyst to the solution; or immersing the film of the PVA in an aqueous solution of the oxidizing agent, taking out the film from the solution, and then immersing the film in an aqueous solution of the acid catalyst.

When the contacting is carried out by immersing the film of the PVA in aqueous solutions as exemplified above, a dissolution inhibitor may be added to the solution as required in the same way as for the one contacting step operation.

When the film of the PVA is contacted with the oxidizing agent and the acid catalyst in two separate contacting steps, the temperature for contacting the film of the PVA with the oxidizing agent to effect the oxidative cleavage is usually 25 to 90° C., preferably 40 to 80° C., and the reaction time is usually 10 minutes to 10 hours, preferably 30 minutes to 4 hours. The temperature for subsequently contacting the film of the PVA with the acid catalyst to catalyze acetalization is usually 25 to 90° C., preferably 40 to 80° C., and the reaction time is usually 10 minutes to 10 hours, preferably 30 minutes to 4 hours. The temperatures and the reaction times for contacting the film of the PVA with the oxidizing agent and the acid catalyst may be the same or different.

After the contacting reactions are completed by any of the above method, it is preferred to wash the obtained film of cross-linked PVA. The washing may be carried out by washing the film with water, neutralizing the film with a slightly alkaline aqueous solution, and again washing the film with water. The slightly alkaline aqueous solution may be selected from a variety of alkaline aqueous solutions as long as the solution neutralizes the excess acid. Preferred examples of such alkaline aqueous solution may include aqueous solutions of sodium hydrogencarbonate, sodium carbonate, sodium phosphate, sodium acetate, sodium salt of organic acids, or mixtures thereof. The duration of each washing, neutralizing, and washing is preferably not shorter than 20 minutes, i.e. in total of not shorter than 1 hour, more preferably not shorter than 1 hour, i.e. in total of not shorter than 3 hours. It should be understood that the time for each treatment may be the same or different.

The degree of cross-linking of the film of cross-linked PVA obtained by the method of the present invention is not particularly limited. Usually, the maximum cross-linking degree is achieved when all the 1,2-diol units in the film of the PVA are spent for the cross-linking reaction. The required minimum cross-linking degree is achieved when the film of cross-linked PVA becomes substantially insoluble in water. The degree of cross-linking may suitably be adjusted by regulating the temperature and the time for the acetalization to form cross-linking mentioned above.

The film of cross-linked PVA obtained by the method of the present invention may be subjected to a post-treatment after the washing step. The post-treatment may include such steps as dewatering by contacting the film of cross-linked PVA with a water absorbing material such as a filter paper, and drying such as drying by heating, vacuum drying, or air-drying.

The film of cross-linked PVA obtained by the above method may preferably has the average thickness of not more than 100 μm, more preferably not more than 50 μm, most preferably not more than 40 μm. With the film thickness of not more than 100 μm, the film resistance will not be too high, and ionic- and water-permeability between the electrode plates will be good. The minimum average thickness of the film of cross-linked PVA is not particularly limited, but usually not less than 10 μm in view of the industrial film forming process and handling facility in the subsequent treatment. It is preferred that the film of cross-linked PVA is uniform.

The film of cross-linked PVA by itself may be used as a separator for an alkali-zinc secondary battery. However, by impregnating the film of cross-linked PVA with glycerin, the property of the film may be improved still further. There is no limitation to the method for impregnating the film of cross-linked PVA with glycerin, but usually the film of cross-linked PVA is immersed in an aqueous solution of glycerin for this purpose. The concentration of the aqueous solution of glycerin is preferably 5 to 90 weight %, more preferably 10 to 80 weight %, most preferably 20 to 70 weight %. It is preferred to immerse the film of cross-linked PVA in the aqueous solution of glycerin for 10 minutes to 48 hours, more preferably for 30 minutes to 24 hours, most preferably for 1 hour to 24 hours, preferably at 10 to 60° C., more preferably at 20 to 40° C.

The amount of glycerin in the impregnated PVA film is preferably 1 to 50 weight %, more preferably 3 to 40 weight %. The amount of glycerin in the impregnated PVA film may be adjusted easily, for example, by controlling the duration of immersion or the concentration of the aqueous solution of glycerin.

An additional component may optionally be added to the aqueous solution of glycerin as long as the object of the present invention is achieved. Examples of such additional component may include hydrophilic solvents such as ethylene glycol or polyethylene glycol.

The film of cross-linked PVA impregnated with glycerin may be subjected to a post-treatment as required. The post-treatment may include such steps as dewatering by contacting the film with a water absorbing material such as a filter paper, and drying such as drying by heating, vacuum drying, or air-drying.

The separator of the present invention includes the film of cross-linked PVA, preferably impregnated with glycerin. The film of cross-linked PVA or the film of cross-linked PVA impregnated with glycerin may be used as a separator by itself, or maybe combined or integrated with other members such as a network structure to prepare a separator. The network structure may be, for example, in the form of a woven fabric, a non-woven fabric, or a micro-porous film. The film of cross-linked PVA may be integrated with the network structure by any means without particular limitation. For example, the film of cross-linked PVA may be laminated on the network structure. The material of the network structure is not particularly limited as along as the material has superior alkali resistance, and may be polyolefins such as polyethylene or polypropylene, or polysulphones. The thickness of the network structure is usually 0.05 to 5.0 mm, preferably 0.1 to 2.0 mm, more preferably 0.2 to 1.0 mm. It is preferred that the network structure has superior liquid retaining property of usually not less than 100%, more preferably not less than 200%. If the liquid retaining property of the network structure is low, the resistance of the network structure is tend to become high. The resistance of the network structure is preferably as low as possible (the lower the resistance, the higher the ionic conductivity is), and is usually not higher than 100 m$\Omega\cdot$cm$^2$, preferably not higher than 50 m$\Omega\cdot$cm$^2$.

The film of cross-linked PVA or the film of cross-linked PVA impregnated with glycerin may be integrated with the other members mentioned above by other methods than laminating. For example, the other member such as the network structure may be immersed in an aqueous solution of the PVA having the particular degree of saponification and dried to prepare a composite film wherein the meshes or the pores in the network structure are filled with the PVA. Subsequently, the obtained composite film is subjected to the contacting steps with the oxidizing agent and the acid catalyst, and optionally impregnation step with glycerin, thereby producing a separator wherein the film of cross-linked PVA optionally impregnated with glycerin is integrated with the other member. In this case, a network structure such as a woven fabric, a non-woven fabric, or a microporous film may be used as the other member.

The separator of the present invention is used in an alkali-zinc secondary battery. The alkali-zinc secondary battery to be produced using the separator is not particularly limited as long as it is composed of at least a zinc electrode, a counter electrode, an alkali electrolyte, and the separator, and may be, for example, a nickel-zinc battery, a zinc-manganese oxide battery, an air-zinc battery, or a silver oxide-zinc battery. Among these, a nickel-zinc battery, an air-zinc battery, and a silver oxide-zinc battery are particularly preferred. The alkali-zinc secondary battery may either be an open type or a sealed type.

The separator of the present invention may be interposed between a zinc electrode and a counter electrode in an alkali-zinc secondary battery. For example, in a nickel-zinc secondary battery, the separator may be interposed between the zinc electrode and the nickel electrode. Alternatively, the separator may be formed directly on the zinc electrode. The separator of the present invention has excellent property to suppress growth of dendrite, low film resistance, superior electrolyte permeability, and excellent electrolyte retaining property. Further, the separator exhibits excellent swelling behavior: for example, the separator swells to saturation in an electrolyte in a short time, and is not tend to expand in two-dimensional direction in an electrolyte. Accordingly, with the separator of the present invention, a nickel-zinc secondary battery with long cycle life and high output density is produced.

The counter electrode of the alkali-zinc secondary battery is not particularly limited. For example, in a nickel-zinc secondary battery, the nickel electrode may be made of sintered nickel, which is predominantly used for nickel-cadmium batteries, or porous nickel obtained by applying an electrically conductive material such as carbon to polyurethane foam, electroplating nickel over the conductive material, and pyrolyzes polyurethane.

The electrolyte in the alkali-zinc secondary battery is not particularly limited, and, for example, an aqueous solution of KOH or NaOH having the concentration of usually 5 to 50 weight %, preferably 10 to 50 weight %, more preferably 20 to 40 weight % may be used. Further, a variety of inorganic ions or inorganic compounds may be added to the electrolyte as long as the object of the present invention is achieved.

The zinc electrode of the alkali-zinc secondary battery is not particularly limited. For example, a zinc electrode produced by binding zinc oxide and metal zinc, and optionally a metal oxide such as indium oxide, with a polymer compound such as a fluororesin which is stable in an electrolyte, may be used.

The alkali-zinc secondary battery provided with the separator of the present invention exhibits high initial discharge capacity since the electrical conductivity of the separator is low. Further, the alkali-zinc secondary battery has longer cycle life compared to the conventional batteries, since destruction of the battery caused by short-circuiting inside the battery due penetration of the separator by dendrite growing from the zinc electrode is prevented for a prolonged period of time, even after the charge-discharge cycle is repeated many times.

When the separator of the present invention includes the film of cross-linked PVA impregnated with glycerin, effects such as high swelling rate, low film resistance, excellent property to suppress growth of dendrite, high alkali resistance, superior electrolyte permeability, excellent electrolyte retaining property, production facility, and low production cost may be achieved. Further, the alkali-zinc secondary battery provided with the separator of the present invention exhibits excellent properties such as high discharge capacity and long cycle life.

EXAMPLES

The present invention will now be explained in detail with reference to Examples and Comparative Examples below. However, the present invention is not limited to Examples.

Example 1-1

A reaction liquid was prepared by dissolving 5 g of sodium metaperiodate, 5 ml of concentrated sulfuric acid, and 20 g of anhydrous sodium sulfate in 100 g of water. A film of PVA having been prepared by partially saponifying polyvinyl acetate was provided in size of 10 cm×10 cm. The degree of saponification of PVA was 96±2%, the content of 1,2-diol units in PVA was 0.5 to 2%, the average thickness of the film was 25 $\mu$m, and the weight of the film was about 0.3 g. This film was immersed in the reaction liquid at 70° C. for 2 hours to effect oxidative cleavage and acetalization in the same reaction system for cross-linking. It was confirmed that the PVA film after the acetalization was insoluble in water.

Immediately after the acetalization, the resulting PVA film was washed by immersing the film in excess amount of water for 1 hour, neutralized by immersing the film in an aqueous solution of 0.1 M sodium hydrogencarbonate for 1 hour, and washed again by immersing the film in water for 1 hour. The resulting film was dried by removing water sufficiently between dry filter papers, and then air dried between fresh filter papers in a drying box flowing nitrogen, to thereby obtain a separator.

The oxidative cleavage of 1, 2-diol units was confirmed using Schiff's reagent, which was colored by trace amount of aldehyde present in the obtained separator. The formation of cross-liking was confirmed by the fact that the PVA film, which was original water-soluble, became water-insoluble.

The separator thus prepared was subjected to measurements of its film thickness and film resistance in accordance with the following methods.

Measurement of Film Resistance

The electrical resistance (m $\Omega \cdot cm^2$) of the separator was measured using a 35 wt % aqueous solution of potassium hydroxide as an electrolyte at 25° C. in accordance with the method defined in JIS C-2313. The result is shown in Table 1.

Measurement of Film Thickness

The thickness of the separator was measured using a micrometer graduated in 1 $\mu$m divisions. The measurement was conducted all over the film longitudinally and transversely at 3 to 5 cm intervals as well as at four corners, and the measured values were averaged to obtain the average film thickness. The result is shown in Table 1.

Further, using the separator thus prepared, a simplified nickel-zinc secondary battery as shown in FIG. 1 was produced for testing charge-discharge cycle life in accordance with the following method.

Evaluation of Charge-Discharge Cycle Life of Nickel-Zinc Secondary Battery

A simplified nickel-zinc secondary battery as shown in FIG. 1 was prepared. In FIG. 1, A shows a zinc electrode wherein 11 is a zinc electrode active material and 12 is an electrode collector, and B shows a nickel electrode wherein 16 is a nickel electrode active material and 17 is an electrode collector. 13 and 14 are retainers, 15 is the separator, and 18 and 19 are a container and a lid. The retainers 13 and 14 and the separator 15 are impregnated with a 35 weight % KOH aqueous solution as an alkaline electrolyte.

The zinc electrode A was prepared by kneading 80 parts by weight of zinc oxide, 15 parts by weight of zinc, and 5 parts by weight of a fluororesin dispersion with water, applying the obtained mixture to the electrode collector 12 by rolling, which is a copper mesh, and heating the resulting product in vacuum. The nickel electrode B was prepared by applying nickel carbonyl to nickel mesh, calcining, and impregnating the resulting product with $Ni(OH)_2$. The theoretical battery capacity was about 1.5 Ah.

The simplified nickel-zinc secondary battery thus produced was placed in a container and sealed. Accelerated charge-discharge cycle test was conducted by initially charging at 0.1 coulomb for 10 hours (charging the electricity in an amount corresponding to the theoretical capacity of the battery for 10 hours), and repeating charging at 0.1 coulomb and discharging at 0.2 coulomb until the battery voltage became 1.0 V, while monitoring the duration of charging and discharging, current, and voltage to evaluate the property of the battery.

As a result of the test, it was confirmed that good discharge capacity was maintained even after 300 cycles. The results are shown in Table 1.

After the test, the battery was disassembled to inspect the zinc electrode. Though formation of dendrite in the zinc electrode was observed, the separator was not broken by the dendrite, and the battery maintained sufficient capacity. Therefore, it was confirmed that the separator had excellent property to suppress growth of dendrite.

Example 1-2

A separator was prepared in the same way as in Example 1-1 except that a film of PVA of which degree of saponification was 88±2% and which contains 0.5 to 2% 1,2-diol units was used. The average thickness of the film was 35 $\mu$m, and the weight of the film was about 0.3 g. The thickness and the film resistance of the obtained separator were measured in the same way as in Example 1-1. The results are shown in Table 1.

Further, a simplified nickel-zinc secondary battery was fabricated using the separator, and the charge-discharge cycle life test was conducted in the same way as in Example 1-1. It was confirmed that the separator had excellent property to suppress growth of dendrite.

Example 1-3

A first reaction liquid was prepared by dissolving 2.5 g of sodium metaperiodate and 30 g of anhydrous sodium sulfate in 150 g of water. A film of PVA having been prepared by partially saponifying polyvinyl acetate was provided. The degree of saponification of PVA was 96±2%, the content of 1,2-diol units in PVA was 0.5 to 2%, the average thickness of the film was 25 $\mu$m, and the weight of the film was about 0.3 g. This film was immersed in the first reaction liquid at 70° C. for 90 minutes to effect oxidative cleavage of 1,2-diol units in the PVA film.

A second reaction liquid was prepared by dissolving 7.5 ml of concentrated sulfuric acid and 30 g of anhydrous sodium sulfate in 150 g of water. Then the PVA film subjected to oxidative cleavage was immersed in the second reaction liquid at 70° C. for 90 minutes to effect acetalization and cross-linking of PVA. The resulting cross-linked PVA film was subjected to washing and air-drying in the same way as in Example 1-1 to produce a separator. The thickness and the film resistance of the obtained separator were measured in the same way as in Example 1-1. The results are shown in Table 1.

Further, a simplified nickel-zinc secondary battery was fabricated using the separator, and the charge-discharge cycle life test was conducted in the same way as in Example 1-1. It was confirmed that the separator had excellent property to suppress growth of dendrite.

Comparative Example 1-1

A film of PVA having been prepared by completely saponifying polyvinyl acetate was provided in size of 10 cm×10 cm. The average thickness of the film was 20 $\mu$m, and the weight of the film was about 0.2 g. This film was immersed in the same reaction liquid as in Example 1-1 at 70° C. for 40 minutes to effect oxidative cleavage and acetalization in the same reaction system for cross-linking. The resulting PVA film was washed and dried in the same way as in Example 1-1, thereby obtaining a separator.

The thickness and the film resistance of the obtained separator were measured in the same way as in Example 1-1. The results are shown in Table 1.

Further, a simplified nickel-zinc secondary battery was fabricated using the separator, and the charge-discharge cycle life test was conducted in the same way as in Example 1-1. As a result, the battery was short-circuited after about 150 cycles. The short-circuited battery was disassembled to inspect the separator. It was observed that dendrite grown from the zinc electrode penetrated the separator. The results are shown in Table 1.

Comparative Example 1-2

A film of PVA of 10 cm×10 cm in size (manufactured by KURARE CORPORATION) was used which had been prepared by completely saponifying polyvinyl acetate. The average thickness of the film was 25 µm, and the weight of the film was about 0.3 g. This film was immersed in the same reaction liquid as in Example 1-1 at 50° C. for 40 minutes to effect oxidative cleavage and acetalization in the same reaction system for cross-linking. The resulting PVA film was washed and dried in the same way as in Example 1-1, thereby obtaining a separator.

The thickness and the film resistance of the obtained separator were measured in the same way as in Example 1-1. The results are shown in Table 1.

Further, a simplified nickel-zinc secondary battery was fabricated using the separator, and the charge-discharge cycle life test was conducted in the same way as in Example 1-1. As a result, it was revealed that the efficiency of the cell reaction of the battery was inferior, so that the discharge capacity was declined gradually. The life of the battery was as short as about 150 cycles. The results are shown in Table 1.

Comparative Example 1-3

A commercially available cellophane film having the thickness of 30 µm was used. The film resistance of the cellophane film was measured in the same way as in Example 1-1. The result is shown in Table 1.

Further, a simplified nickel-zinc secondary battery was fabricated using the cellophane film as a separator, and the charge-discharge cycle life test was conducted in the same way as in Example 1-1. As a result, the battery was short-circuited after about 100 cycles. The short-circuited battery was disassembled to inspect the separator. It was observed that dendrite grown from the zinc electrode penetrated the separator.

TABLE 1

| | Film Thickness (µm) | Degree of Saponification (%) | Film Resistance ($\mu\Omega \cdot cm^2$) | Battery Property |
|---|---|---|---|---|
| Example 1-1 | 25 | 96 | 60–80 | Excellent cycle life Superior in suppressing dendrite growth |
| Example 1-2 | 35 | 88 | 70–90 | Excellent cycle life Superior in suppressing dendrite growth |
| Example 1-3 | 25 | 95 | 95 | good cycle life Sufficient in suppressing dendrite growth |
| Comp. Ex. 1-1 | 20 | complete | 90 | Inferior cycle life Poor in suppressing dendrite growth |
| Comp. Ex. 1-2 | 25 | complete | 110 | Inferior cycle life High film resistance |

TABLE 1-continued

| | Film Thickness (µm) | Degree of Saponification (%) | Film Resistance ($\mu\Omega \cdot cm^2$) | Battery Property |
|---|---|---|---|---|
| Comp. Ex. 1-3 | 30 | — | 50–60 | Inferior cycle life Poor in suppressing dendrite growth |

Example 2-1

A reaction liquid was prepared by dissolving 5 g of sodium metaperiodate, 5 ml of concentrated sulfuric acid, and 20 g of anhydrous sodium sulfate in 100 g of water. A film of PVA having been prepared by partially saponifying polyvinyl acetate was provided in size of 10 cm×10 cm. The degree of saponification of PVA was 96±2%, the content of 1,2-diol units in PVA was 0.5 to 2%, the average thickness of the film was 25 µm, and the weight of the film was about 0.3 g. This film was immersed in the reaction liquid at 70° C. for 2 hours to effect oxidative cleavage and acetalization in the same reaction system for cross-linking. It was confirmed that the PVA film after the acetalization was insoluble in water.

Immediately after the acetalization, the resulting PVA film was washed by immersing the film in excess amount of water for 1 hour, neutralized by immersing the film in an aqueous solution of 0.1 M sodium hydrogencarbonate for 1 hour, and washed again by immersing the film in water for 1 hour. The resulting film was then immersed in a 50 weight % aqueous solution of glycerin at the room temperature for 16 hours, and dried, thereby producing a separator. The amount of glycerin impregnated in the resulting separator was 30 weight %.

The obtained separator was subjected to evaluations of the swelling property, the film resistance, and the property to suppress growth of dendrite in accordance with the following methods.

Evaluation of Swelling Property

The separator was cut to prepare a sample piece of 3 cm×3.5 cm in size, and immersed in a 35 weight % aqueous solution of potassium hydroxide at 25° C. The time required for the sample to be saturated with the solution, i.e. the swelling rate, and the increase ratio in size of the sample by swelling, i.e. the average value of the increase ratio in the length of each side of the sample were measured.

Evaluation of Property to Suppress Growth of Dendrite

Figure 2:
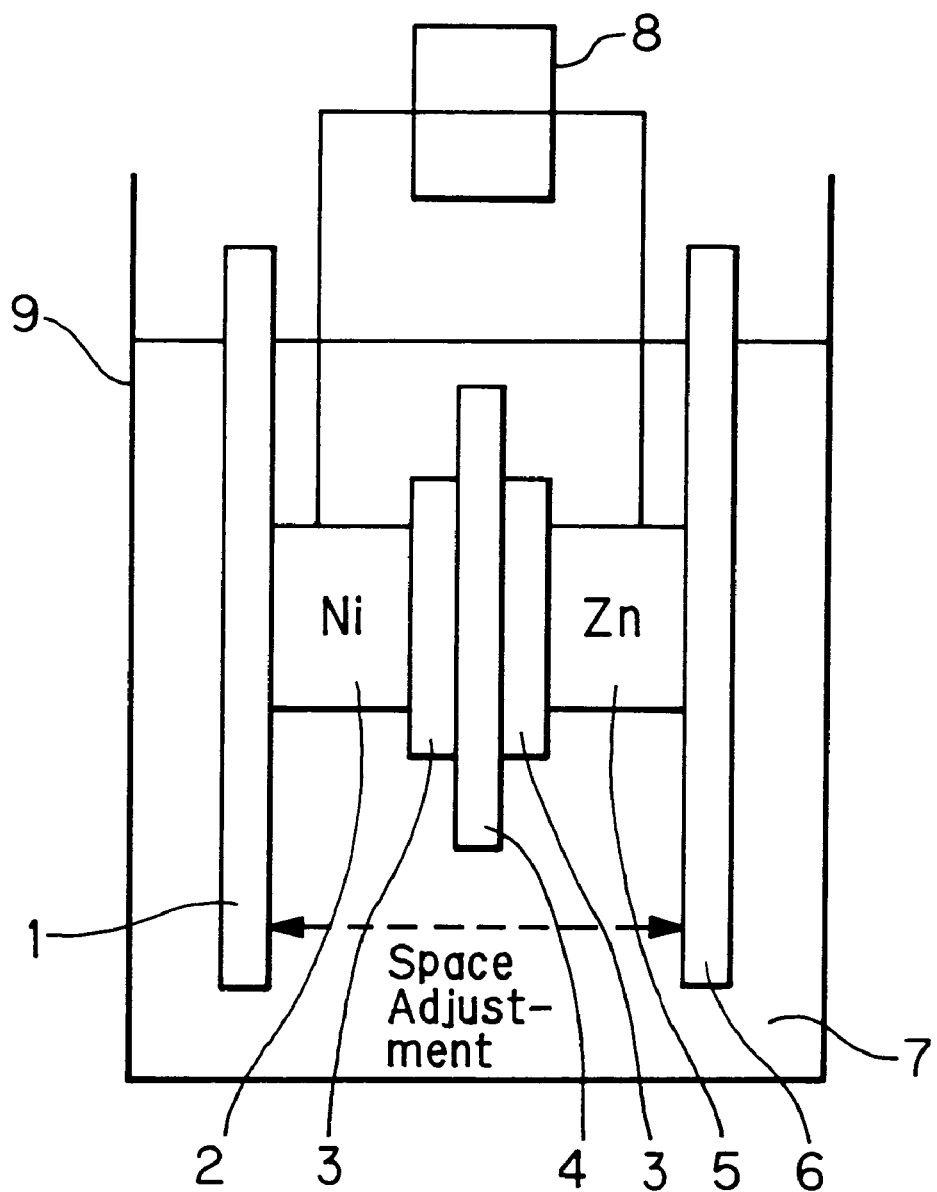
FIG. 2 is a schematic view of a simplified nickel-zinc secondary battery used in Examples and Comparative Examples for evaluating property to suppress growth of dendrite.

Using the separator, an open-type simplified nickel-zinc secondary battery as shown in FIG. 2 was prepared. In the figure, 1 is a presser plate A, 2 is a nickel electrode, 3 is a retainer, 4 is the separator, 5 is a zinc electrode, 6 is a presser plate B, 7 is an electrolyte (ZnO saturated aqueous solution containing 35% KOH), 8 is a power supply and device for measuring the voltage, and 9 is a vessel.

The simplified secondary battery was subjected to boosting charge up to 20 coulomb at the current density of 0.28 A/cm$^2$ while the potential difference between the electrodes was monitored. When a dendrite grows from the zinc electrode with the progress of charge and penetrate the separator to reach the nickel electrode, sharp potential change is to be observed. Therefore, the time required for the occurrence of such sharp potential change from the commencement of charge was measured, and the distance between the two electrodes was divided by the measured value of time, thereby evaluating the growth rate of dendrite.

The slower the growth rate of dendrite, the better the property of the separator to suppress growth of dendrite. The results of the measurements are shown in Table 2.

Measurement of Film Resistance

The film resistance of the resulting separator was measured in the same way as in Example 1-1. The results are shown in Table 2.

As seen from Table 2, the obtained separator swelled to saturation in a short time, and had low increase ratio in size, exhibiting excellent properties.

Further, using this separator, a simplified nickel-zinc secondary battery was fabricated, and the charge-discharge cycle life test was conducted in the same way as in Example 1-1. As a result, it was revealed that the battery had high discharge capacity and long cycle life.

Example 2-2

A separator was produced in the same way as in Example 2-1 except that a 20 weight % aqueous solution of glycerin was used in place of 50 weight % aqueous solution of glycerin. The amount of glycerin impregnated in the separator was 18 weight %.

The obtained separator was subjected to the evaluations of the swelling property, the film resistance, and the property to suppress growth of dendrite in the same way as in Example 2-1. The results are shown in Table 2.

As seen from Table 2, the obtained separator swelled to saturation in a short time, and had low increase ratio in size, exhibiting excellent properties.

Further, using this separator, a simplified nickel-zinc secondary battery was fabricated, and the charge-discharge cycle life test was conducted in the same way as in Example 1-1. As a result, it was revealed that the battery had high discharge capacity and long cycle life.

Example 2-3

A separator was produced in the same way as in Example 2-1 except that the film was immersed in the aqueous solution of glycerin for 3 hours. The amount of glycerin impregnated in the resulting separator was 25 weight %.

The obtained separator was subjected to the evaluations of the swelling property, the film resistance, and the property to suppress growth of dendrite in the same way as in Example 2-1. The results are shown in Table 2.

As seen from Table 2, the obtained separator swelled to saturation in a short time, and had low increase ratio in size, exhibiting excellent properties.

Further, using this separator, a simplified nickel-zinc secondary battery was fabricated, and the charge-discharge cycle life test was conducted in the same way as in Example 1-1. As a result, it was revealed that the battery had high discharge capacity and long cycle life.

Example 2-4

A separator was produced in the same way as in Example 2-1 except that the film was immersed in the aqueous solution of glycerin at 50° C. instead of the room temperature. The amount of glycerin impregnated in the resulting separator was 35 weight %.

The obtained separator was subjected to the evaluations of the swelling property, the film resistance, and the property to suppress growth of dendrite in the same way as in Example 2-1. The results are shown in Table 2.

As seen from Table 2, the obtained separator swelled to saturation in a short time, and had low increase ratio in size, exhibiting excellent properties.

Further, using this separator, a simplified nickel-zinc secondary battery was fabricated, and the charge-discharge cycle life test was conducted in the same way as in Example 1-1. As a result, it was revealed that the battery had high discharge capacity and long cycle life.

Example 2-5

A separator was prepared in the same way as in Example 2-1 except that another PVA film having been prepared by partially saponifying polyvinyl acetate was used. The degree of saponification of PVA was 88±2%, the content of 1,2-diol units in PVA was 0.5 to 5%, the average thickness of the film was 35 $\mu$m, and the weight of the film was about 0.4 g. The amount of glycerin impregnated in the resulting separator was 33 weight %.

The obtained separator was subjected to the evaluations of the swelling property, the film resistance, and the property to suppress growth of dendrite in the same way as in Example 2-1. The results are shown in Table 2.

As seen from Table 2, the obtained separator swelled to saturation in a short time, and had low increase ratio in size, exhibiting excellent properties.

Further, using this separator, a simplified nickel-zinc secondary battery was fabricated, and the charge-discharge cycle life test was conducted in the same way as in Example 1-1. As a result, it was revealed that the battery had high discharge capacity and long cycle life.

Comparative Example 2-1

A film of PVA having been prepared by completely saponifying polyvinyl acetate was provided in size of 10 cm×10 cm. The average thickness of the film was 20 $\mu$m, and the weight of the film was about 0.2 g. This film was immersed in the same reaction liquid as in Example 2-1 at 70° C. for 40 minutes to effect oxidative cleavage and acetalization in the same reaction system for cross-linking. It was confirmed that the PVA film after the acetalization was insoluble in water.

Immediately after the acetalization, the resulting PVA film was washed by immersing the film in excess amount of water for 1 hour, neutralized by immersing the film in an aqueous solution of 0.1 M sodium hydrogencarbonate for 1 hour, washed again by immersing the film in water for 1 hour, and dried, thereby obtaining a separator.

The obtained separator was subjected to the evaluations of the swelling property, the film resistance, and the property to suppress growth of dendrite in the same way as in Example 2-1. The results are shown in Table 2.

As seen from Table 2, the obtained separator required long time for swelling to saturation, had high increase ratio in size, and had high film resistance.

Further, using this separator, a simplified nickel-zinc secondary battery was fabricated, and the charge-discharge cycle life test was conducted in the same way as in Example 1-1. As a result, the battery was short-circuited after far fewer cycles compared to the battery of Example 2-1.

Comparative Example 2-2

A film of PVA having been prepared by completely saponifying polyvinyl acetate was provided in size of 10 cm×10 cm. The average thickness of the film was 25 $\mu$m, and the weight of the film was about 0.3 g. This film was immersed in the same reaction liquid as in Example 2-1 at 50° C. for 40 minutes to effect oxidative cleavage and acetalization in the same reaction system for cross-linking.

Immediately after the acetalization, the resulting PVA film was washed and dried in the same way as in Example 2-1, thereby obtaining a separator.

The obtained separator was subjected to the evaluations of the swelling property, the film resistance, and the property to suppress growth of dendrite in the same way as in Example 2-1. The results are shown in Table 2.

As seen from Table 2, the obtained separator required long time for swelling to saturation, had high increase ratio in size, and had high film resistance.

Further, using this separator, a simplified nickel-zinc secondary battery was fabricated, and the charge-discharge cycle life test was conducted in the same way as in Example 1-1. As a result, the discharge capacity of the battery was gradually reduced, exhibiting far shorter cycle life compared to the battery of Example 2-1.

Comparative Example 2-3

A commercially available cellophane film having the thickness of 30 $\mu$m was used as a separator. The separator was subjected to the evaluations of the swelling property, the film resistance, and the property to suppress growth of dendrite in the same way as in Example 2-1. The results are shown in Table 2.

As seen from Table 2, the separator was extremely inferior in the property to suppress growth of dendrite.

Further, using this separator, a simplified nickel-zinc secondary battery was fabricated, and the charge-discharge cycle life test was conducted in the same way as in Example 1-1. As a result, the battery was short-circuited after even fewer cycles compared to Comparative Example 2-2.

TABLE 2

|  | Swelling Rate (min) | Increase Ratio in Size (%) | Film Resistance ($\mu\Omega \cdot cm^2$) | Growth Rate of Dendrite ($\mu$m/min) |
|---|---|---|---|---|
| Example 2-1 | 1.0 | 11 | 72 | 36 |
| Example 2-2 | 1.5 | 13 | 68 | 29 |
| Example 2-3 | 1.2 | 13 | 65 | 31 |
| Example 2-4 | 0.9 | 10 | 62 | 31 |
| Example 2-5 | 1.1 | 14 | 78 | 28 |
| Comp. Ex. 2-1 | 78 | 23 | 74 | 48 |
| Comp. Ex. 2-2 | 69 | 25 | 77 | 43 |
| Comp. Ex. 2-3 | 1.0 | 12 | 60 | 148 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for producing a cross-linked polyvinyl alcohol separator comprising a film of cross-linked polyvinyl alcohol for an alkali-zinc secondary battery comprising the steps of:
   (1) providing a film of polyvinyl alcohol having degree of saponification of 70 to 98.5% and containing 1,2-diol units;
   (2) contacting said film of polyvinyl alcohol with an oxidizing agent to effect oxidative cleavage of said 1,2-diol units;
   (3) contacting said film of polyvinyl alcohol with an acid catalyst to catalyze acetalization to form a film of cross-linked polyvinyl alcohol; and
   (4) preparing a separator with said film of cross-linked polyvinyl alcohol.

2. The method as claimed in claim 1 wherein content of said 1,2-diol units in the polyvinyl alcohol in said step (1) is 0.1 to 20% in terms of ratio of half the number of carbon atoms relating to 1,2-diol units to number of carbon atoms in main chain of polyvinyl alcohol to which a hydroxyl group is bonded.

3. The method as claimed in claim 1 wherein degree of polymerization of said polyvinyl alcohol in said step (1) is 50 to 10000.

4. The method as claimed in claim 1 wherein thickness of said film of polyvinyl alcohol in said step (1) is not more than 100 $\mu$m.

5. The method as claimed in claim 1 wherein said oxidizing agent is selected from the group consisting of periodic acid ($HIO_4$), sodium metaperiodate ($NaIO_4$), potassium metaperiodate ($KIO_4$), lead tetraacetate ($Pb(OAc)_4$, wherein Ac stands for an acetyl group), activated manganese dioxide, salts of trivalent thallium, and mixtures thereof.

6. The method as claimed in claim 1 wherein said acid catalyst is selected from the group consisting of sulfuric acid, nitric acid, hydrogen chloride, acetic acid, oxalic acid, benzoic acid, and mixtures thereof.

7. The method as claimed in claim 1 wherein said step (2) contacting the film with said oxidizing agent is carried out at 25 to 90° C. for 10 minutes to 10 hours, and said step (3) contacting the film with an acid catalyst is carried out at 25 to 90° C. for 10 minutes to 10 hours.

8. The method as claimed in claim 1 wherein said steps of (2) contacting said film of polyvinyl alcohol with an oxidizing agent and (3) contacting said film of polyvinyl alcohol with an acid catalyst are carried out simultaneously by reacting said film of polyvinyl alcohol with said oxidizing agent in the presence of said acid catalyst to form a film of cross-linked polyvinyl alcohol.

9. The method as claimed in claim 8 wherein said reaction of said film of polyvinyl alcohol with said oxidizing agent in the presence of said acid catalyst is carried out by immersing the film in an aqueous solution of said oxidizing agent and said catalyst.

10. The method as claimed in claim 8 wherein said reaction of said film of polyvinyl alcohol with said oxidizing agent in the presence of said acid catalyst is carried out at 25 to 90° C. for 10 minutes to 10 hours.

11. The method as claimed in claim 1 wherein said film of cross-linked polyvinyl alcohol obtained in said step (3) is impregnated with glycerin before preparing a separator in said step (4).

12. The method as claimed in claim 11 wherein said film of cross-linked polyvinyl alcohol obtained in said step (3) is impregnated with glycerin by immersing said film of cross-linked polyvinyl alcohol obtained in said step (3) in a 5 to 90 weight % aqueous solution of glycerin for 10 minutes to 48 hours.

13. A cross-linked polyvinyl alcohol separator for an alkali-zinc secondary battery comprising:
   a film of cross-linked polyvinyl alcohol impregnated with glycerins obtained by a method comprising the steps of:
   (1) providing a film of polyvinyl alcohol having degree of saponification of 70 to 98.5% and containing 1,2-diol units;
   (2) contacting said film of polyvinyl alcohol with an oxidizing agent to effect oxidative cleavage of said 1,2-diol units; and
   (3) contacting said film of polyvinyl alcohol with an acid catalyst to catalyze acetalization to form a film of cross-linked polyvinyl alcohol.

14. The cross-linked polyvinyl alcohol separator as claimed in claim 13 wherein average thickness of said film of cross-linked polyvinyl alcohol is not more than 100 μm.

15. The cross-linked polyvinyl alcohol separator as claimed in claim 13 wherein said film of cross-linked polyvinyl alcohol impregnated with glycerin contains 1 to 30 weight % glycerin.

16. A cross-linked-polyvinyl alcohol separator for an alkali-zinc secondary battery comprising:
  a film of cross-linked polyvinyl alcohol obtained by a method comprising the steps of:
    (1) providing a film of polyvinyl alcohol having degree of saponification of 70 to 98.5% and containing 1,2-diol units;
    (2) contacting said film of polyvinyl alcohol with an oxidizing agent to effect oxidative cleavage of said 1,2-diol units; and
    (3) contacting said film of polyvinyl alcohol with an acid catalyst to catalyze acetalization to form a film of cross-linked polyvinyl alcohol;
  wherein said separator further comprises a network structure laminated on said film of cross-linked polyvinyl alcohol.

17. The cross-linked polyvinyl alcohol separator as claimed in claim 13 wherein said separator further comprises a network structure laminated on said film of cross-linked polyvinyl alcohol impregnated with glycerin.

18. A cross-linked-polyvinyl alcohol separator for an alkali-zinc secondary battery comprising:
  a film of cross-linked polyvinyl alcohol obtained by a method comprising the steps of:
    (1) providing a film of polyvinyl alcohol having degree of saponification of 70 to 98.5% and containing 1,2-diol units;
    (2) contacting said film of polyvinyl alcohol with an oxidizing agent to effect oxidative cleavage of said 1,2-diol units; and
    (3) contacting said film of polyvinyl alcohol with an acid catalyst to catalyze acetalization to form a film of cross-linked polyvinyl alcohol;
  wherein said film of polyvinyl alcohol in said step (1) has a network structure integrated in said film, and wherein said film of cross-linked polyvinyl alcohol has said network structure integrated in said film.

19. The cross-linked polyvinyl alcohol separator as claimed in claim 18 wherein said film of cross-linked polyvinyl alcohol is impregnated with glycerin.

* * * * *